J. SENSENIG.
Fertilizer-Distributors.
No. 151,720. Patented June 9, 1874.
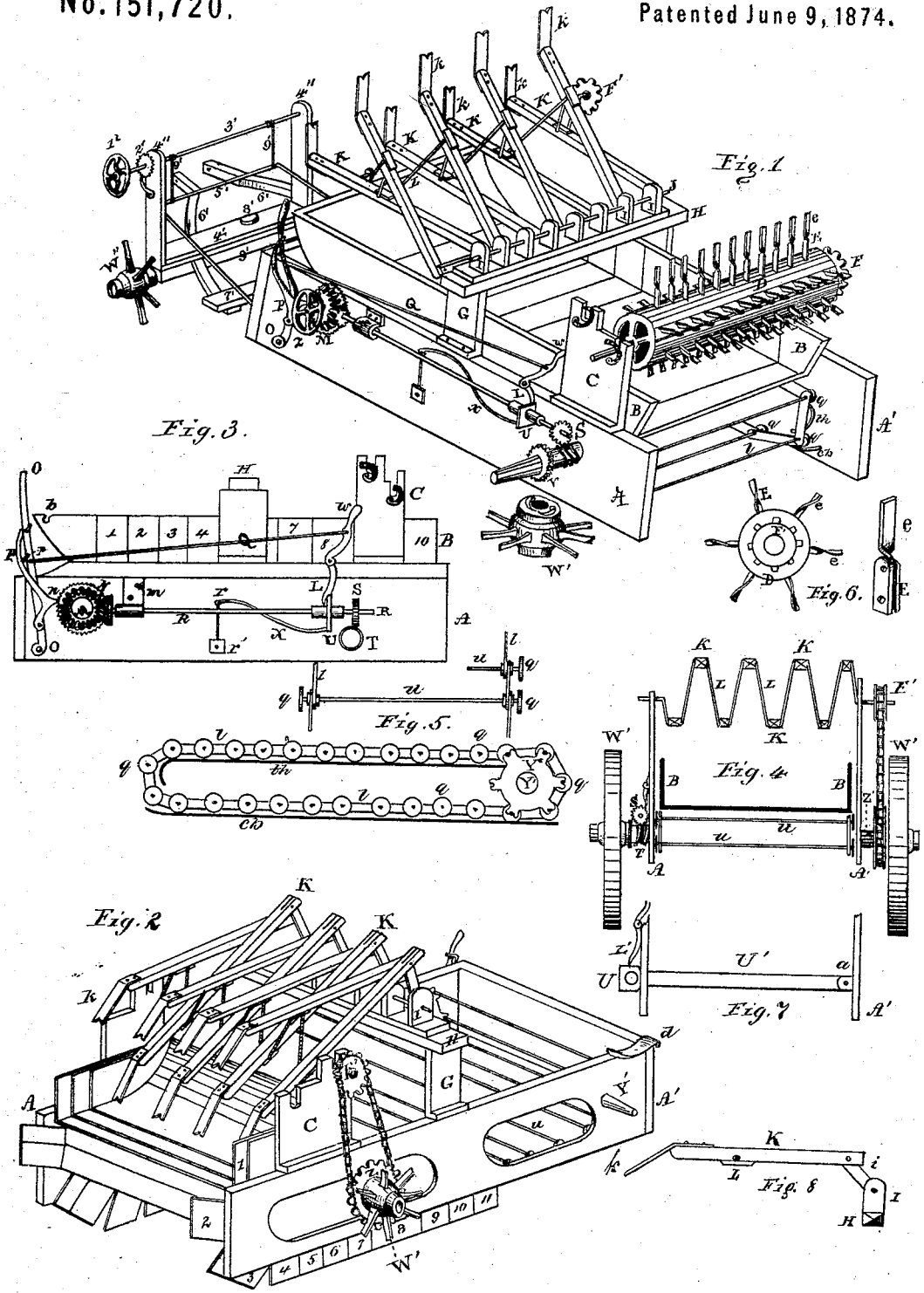
WITNESSES.
W. B. Wiley
Jacob Stauffer
INVENTOR.
Joseph Sensenig

UNITED STATES PATENT OFFICE.

JOSEPH SENSENIG, OF EARL TOWNSHIP, NEAR REIDENBACH'S STORE POST-OFFICE, LANCASTER COUNTY, PENNSYLVANIA.

IMPROVEMENT IN FERTILIZER-DISTRIBUTERS.

Specification forming part of Letters Patent No. 151,720, dated June 9, 1874; application filed February 21, 1874.

*To all whom it may concern:*

Be it known that I, JOSEPH SENSENIG, of Earl township, near Reidenbach's Store Post-Office, in the county of Lancaster and State of Pennsylvania, have invented certain Improvements in a Vehicle or Farm-Wagon for conveying lime, manure, or the like to the field, and distributing or dumping the same by mechanical means, and of which the following is a specification:

The object of my invention may be more fully stated by saying that in combination with the vehicle or wagon used to convey the lime, manure, or the like to the field, is the employment of mechanical means to perform the disagreeable office of unloading and distributing the same broadcast over the ground destined to receive it, as also for dumping stone, clay, or the like upon a heap, or scattering by driving on.

The accompanying drawings, with the letters of reference marked thereon, together with a brief description of the construction and operation, will enable any one skilled in the art to make and use the same, in which—

Figure 1 is a perspective view of the vehicle, showing the cylinder for distributing lime, with its series of hinged beaters in place, the manure-spreaders on their cranks thrown forward on their hinged supports, so as to be out of the way; showing also a hoisting device in front, and the hind wheel taken off to show the pawl and spring on the hub, and the ratchet and worm or screw on the axle of the wheel on one side. Fig. 2 shows the other side of the vehicle, with the hoisting device detached, as also the cylinder, and the manure-spreaders in position, and the inner or traveling bed run back to the rear, ready to unshift the gearing automatically. Fig. 3 is a side elevation in part, to show the traveling bed brought forward, together with the gearing and shifting-pawls and levers. Fig. 4 is a rear elevation, showing the relative position of the outer fixed sides and traveling bed, chain, and pulleys to operate the crank and spreaders. Fig. 5 shows the upper and lower guide or tramway for the pulleys on the ends of the rods linked together, forming an endless chain, operated by the six-angled rod or rag wheels on the front gear-shaft. A similar track is affixed to the inside of each of the fixed sides of the vehicle. Fig. 6 shows an end view of the cylinder, with its chain-wheel attached, and the six series of jointed beaters held by a fulcrum-pin below, and a wooden pin to stiffen it and resist all ordinary use, but so as to break the wooden pin should the resistance be too great. Fig. 7 shows the hinged bearing on the hind end of the shaft for unshifting the pinion from the screw or gear on the axle of the wheel. Fig. 8 shows one of the manure-spreaders with its connections and several parts.

A four-wheeled vehicle may be made complete, with the hoisting apparatus in place; or the hoisting apparatus can be attached with the bolt 8 on the bolster of the front wheels of an ordinary farm-wagon, and the two-wheeled vehicle, Fig. 2, connected thereto or used for certain purposes independently, like a cart. The hoisting apparatus consists of a crosspiece, 4', bolted to the bolster in this case, having an upright, 4'', at each end for a shaft or windlass, 3', supported above in bearings. This shaft has a ratchet and pawl, 2', and a hand turn-wheel, 1', for revolving and holding the shaft or windlass. An arm, 5', is connected on each side to the lower part in front of the fixed bed A A'. These arms are joined in front at 5', and between the uprights 4'' 4'', and connected by cords 9' to the winding-shaft 3', by which the front part of the vehicle can be raised up for dumping purposes, in connection with the traveling inner box B, presently to be described.

Two sides, A A', are united in front, and form the outer or fixed bed, and a support for the gearing and appliances. The axle of the hind wheels W' passes centrally through these sides, as shown, and, by means of a screw or worm on one side, A, and a chain pulley-wheel, Z, on the other, A', propels the machinery when in motion. A ratchet-wheel, v, and pawl to prevent motion in backing on the one, and a clutch to throw in or out of gear on the other, are common devices, and require no special description. In Fig. 3 the side A is shown with the external gearing. On a shaft, Y', near the front, centrally from side to side, there is shown a ratchet-wheel, N, in connection with a bevel cog-wheel, M. There is also on the end of this shaft a hand turn-wheel, $z$, Fig. 1, used for running the traveling bed B back again, which will be more fully explained. There is a lever, O, with a spring-pawl, P, connected thereto, to engage into the ratchet N of or on the edge of the bevel-wheel M. There is a shaft, R, held in front in a fixed bearing, $m$, and near the end in a shifting bearing, U. This shaft has a pinion, S, on its hind end, and receives motion from the screw or worm T on the axle. On the forward end there is a bevel-pinion, $s$, which gives motion to the beveled cog-wheel M on the shaft Y', which shaft supports, on the inner face of the sides A A', a six-cornered or forked cogged rod or rag wheel, Y, Fig. 5, which propels the traveling bed B on the tramway $t\ h$ and $c\ b$ for the pulleys $q$ on the ends of the rods $u$, united on each side by links $l$, to which links the segments forming the bottom and sides of the traveling bed B are connected to the number required. (Eleven or twelve are shown.) This traveling bed B is rounded in front, or boat-shaped, the better to discharge all the contents, and forms the first or larger segment, succeeded by hinged or overlapping segments, partially duplicated to form the lap 1, 2, 3, &c., of uniform size, as wide as the links $l$, to which the bottom of each segment is separately attached. Thus, as the rod-wheels Y catch and carry the rods with their links and pulleys, segment after segment is drawn back and turned under, and would thus alone discharge its load. There is a tripper, $b$, in front of the traveling bed, which comes in contact with a lever, $w$, when the load is discharged by being drawn back to its full extent. This lever connects with a foot, L, resting upon and pressing down the vibrating bearing U, which keeps the pinion S in gear. When, however, the tripper strikes this lever $w$, it is turned, and a spring, $x$, under the vibrating bearing U, raises it up and unshifts the pinion, while, at the same time, this lever W connects by a rod, Q, with the lever O and its pawl P, so as also to unshift said pawl, held spring-fashion on a pin, $p$, on the lever O. Then, by using the hand or turn wheel $z$, the traveling bed B is again run forward until it strikes the stop or check $d$, (shown in Fig. 2,) when it assumes the position shown in Figs. 1 and 3, ready to receive another load.

On the fixed side pieces A A' there are two uprights permanently fixed; the one in the rear, C, has two bearings, one for the shaft $f$ of the cylinder, with its beaters E $e$, for distributing lime, as it is made to revolve over the traveling bed, bringing the beaters $e$ in close contact with the bottom, from which it pitches the lime over the rear segment as they are fed back by the action of the gearing, scattering it effectually. The object for jointing the beaters E $e$ has already been mentioned. They are held stiff on their lower fulcrum-pin in E by an upper wooden pin, and only yield when said wooden pin is broken.

This I am aware is no new device for that purpose; but I am not aware that it was ever before so combined. This cylinder has its own chain-pulley F, to connect with the chain-pulley Z' on the axle of the wheel.

For spreading manure, the beaters would be liable to become entangled with the straw. I therefore remove the cylinder, and use the other bearing on C, raised somewhat, for the crank-shaft L and its chain-pulley F'. Fig. 4 shows this crank and the connection with the eight spreaders K. (Shown in perspective, Fig. 2, and in profile, Fig. 8.) The shaft K, with its notched fork or pitcher $k$, connects plate $i$ to the slotted support I on the cross-bar H, either permanently fixed to or made detachable from the fixed upright G on the sides A A'. The action of these spreaders on their alternating cranks is readily understood. Four at a time alternately dip down and are projected outward or backward, so as to take hold of and pitch the manure in a similar manner as if done by hand labor, actually scattering it broadcast, and thinly or equally spread on the ground traveled over without further attention than that of driving the team until the entire load is discharged, when the gearing is automatically shifted out of gear; then the now empty bed can be turned up and forward again into position for a fresh load.

By means of the pulleys $q$ on the ends of the rods $u$ and tramways $t\ h$ and $c\ b$, and the segments and link-connections of the traveling bed, when loaded with stone or clay, and when elevated in front by the hoisting attachment, the downward pressure of the loaded bed is sufficient, by the gravitating force, to cause the segmental bed B to travel and discharge the load on a heap, or scattered along for turnpiking, if the vehicle is in motion. The same chain-gear from the axle of the wheel will drive the cylinder or spreaders, being also mounted upon the same upright, but a separate bearing on said upright C, which latter is a fixed part of the outer or fixed bed A A'. Thus a great range is given to the vehicle, whether of two wheels only, and so used with its proper pole or shafts, or joined to the front wheels of an ordinary farm-wagon, as already stated, or a complete four-wheeled vehicle with the hoisting attachment all combined, as in either case the combination and operation are the same, and the changes involved do not affect the main office or functions herein set forth.

I am aware that there is no novelty in the endless link-chain and pulley operation, or separate parts of the gearing and appliances, as such may be seen distributed in various mechanical contrivances. Hence, I do not, *per se*, claim such mechanical devices; but I am not aware that they were ever before combined and arranged substantially in the manner and for the purpose set forth and described. Therefore,

What I claim as my invention, in combination with a vehicle or farm-wagon, is—

1. The traveling or folding bed B, composed of slats, with their respective side and bottom pieces 1, 2, 3, 4, &c., and the tripper b, the whole constructed, arranged, and operated substantially in the manner and for the purpose herein mentioned.

2. In combination with the stationary sides A A', the uprights C, uprights G', cross-piece H, bearings I, connecting-rods i, and forks K on double crank L, operated by a chain-pulley, F, arranged substantially in the manner and for the purpose set forth.

3. In combination with the fixed sides A A' and traveling bed B, the hoisting apparatus consisting of the uprights 4", cross-piece 4', windlass, pawl, and ratchet 1', 2', 3', cords 9', and combined rods 5 5', the whole substantially constructed and arranged in the manner and for the purpose mentioned.

4. In combination with the fixed sides A A', the shaft Y', with its rod-wheels or pulleys Y, united ratched and beveled cog-wheel N M, lever and pawl O P, spindle R in bearings fixed at m, with bevel-pinion s, vibrating bearing U, and pinion S, shifting-lever w L', and its connecting-rod Q, the whole arranged substantially and operated in the manner and for the purpose set forth.

JOSEPH SENSENIG.

Witnesses:
WM. B. WILEY,
JACOB STAUFFER.